United States Patent Office

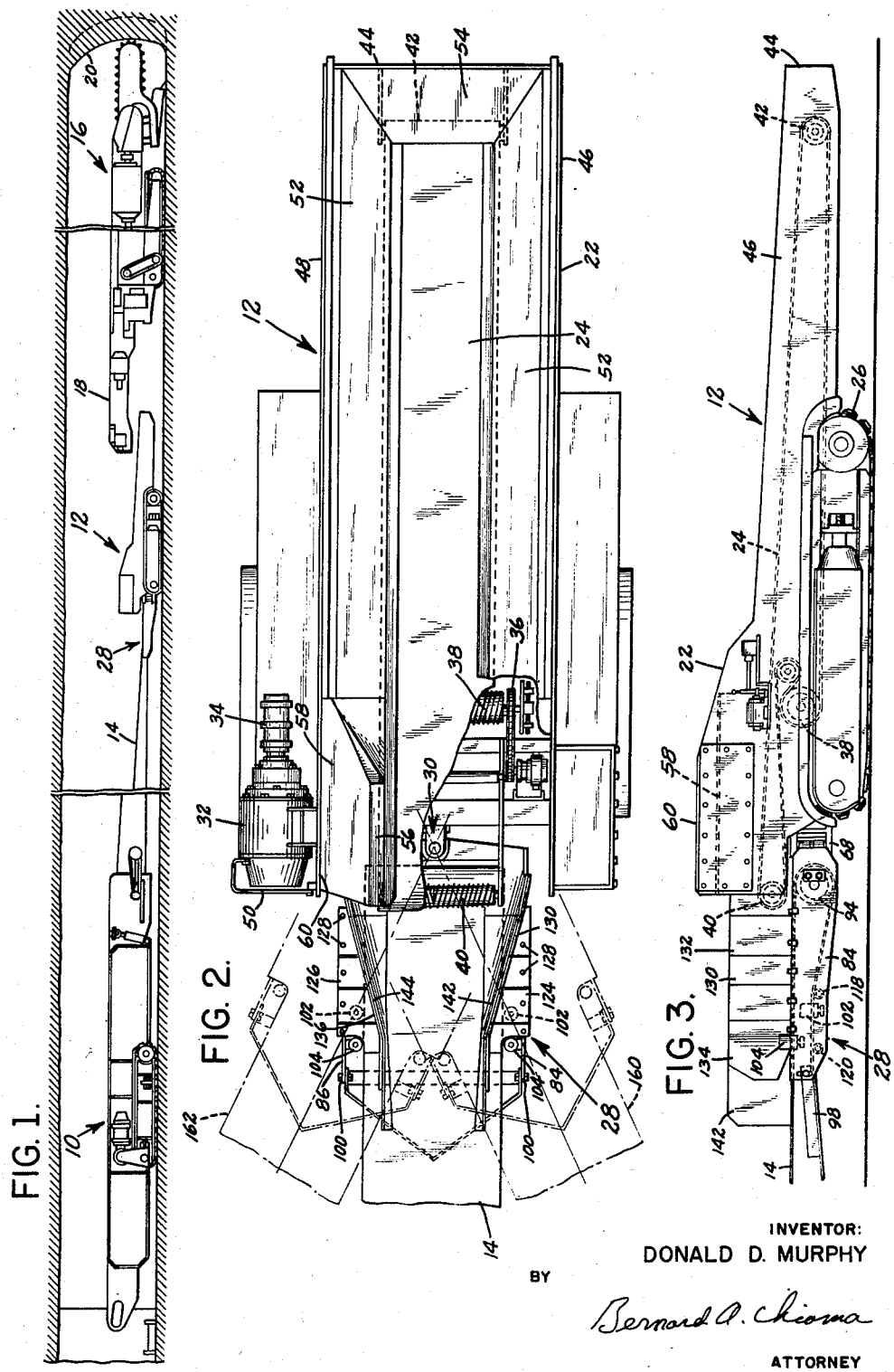

2,925,900
Patented Feb. 23, 1960

2,925,900

EXTENSIBLE BELT TAIL SECTION AND BUGGY THEREFOR

Donald D. Murphy, New Philadelphia, Ohio, assignor to Joy Manufacturing Company, Pittsburgh, Pa., a corporation of Pennsylvania Application July 10, 1956, Serial No. 596,986

5 Claims. (Cl. 198—100)

This invention relates to extensible belt conveyor devices and more particularly to improvements in such devices whereby the belt tail section may be pivoted about various axes for permitting relative play between the terminal pulley thereof and a take-up buggy and this is coupled with a conveyor on the buggy and means for centering the travel of material from the conveyor to the extensible belt.

In devices of this general character it is customary to include two self-propelled vehicles, a larger, rearward one called a drive buggy which houses the usual storage drum and driving mechanism for reeling in or paying out the belt, and a smaller, forward one called a take-up buggy which usually underlies the rear conveyor section of a continuous miner or other source of material. In the event that crosscuts are to be made in a coal vein wherein the miner will be turned during operation thereof until the plane of the work face of the coal seam will eventually lie parallel to the extensible belt, a shuttle car and/or a conveyor carriage is inserted between the take-up buggy and the rear section of the continuous miner for presenting a smooth, angular arrangement of conveyors traversing a 90° arc. In such an operation, the rear conveyor section of the continuous miner may be pivoted to its extreme angular position, say on the order of 30°, with respect to the longitudinal axis of the miner. The shuttle car or conveyor carriage could be positioned at an angle with respect to the rear conveyor section, and the conveyor belt take-up buggy would be positioned to complete the full 90° arc as the mining operation is completed to a full swing into the crosscut. Between the initial start of the crosscut operation wherein the various pieces of mining equipment are in longitudinal alignment and the completion of the crosscut turn wherein the continuous miner is approximately 90° to the extensible belt conveyor, the equipment will assume various angular relationships for insuring a steady conveyance of material from the workface to the extensible belt. However, this has entailed the use of an excessive amount of mining equipment such as shuttle cars and/or conveyor carriages which could be utilized elsewhere, or not at all. Generally too, the take-up buggy and the conveyor carriage are not provided with devices for insuring the proper transfer of material thereon from the next preceding mining apparatus for any relatively large angular relationship between the apparatus. Consequently the respective conveyor sections must be driven at relatively slow speeds for preventing spillage that normally develops at the points where one conveyor section discharges material onto another section.

Generally, the various conveyor sections for the system described above are traveling at different speeds, have different capacities and have different discharge rates. Frequently, one conveyor section will not be able to discharge the mined material at the rate which the material is discharged upon the same, and consequently, one or more of the mining apparatus must be stopped until this overload has diminished. In addition, with three or more independently driven conveyor sections, more operations and operators are required to synchronize the apparatus for movement in the crosscut turn. Also, in the event one of the sections breaks down, the whole mining operation is shut down while that unit is repaired or replaced.

Another disadvantage of the present day mining apparatus arrangement which employs an extensible belt tail section is the inability to adequately cope with uneven mine floors. In the event the take-up buggy is positioned on a mine floor which may have a slight rise or drop, the belt may rub against certain buggy structure which overlies or underlies the belt adjacent its reversing idler. Occasionally the buggy may be laterally swung out of longitudinal alignment with the belt, say for example when the floor is slightly tilted, or when the take-up buggy is being moved forward. In the present day extensible belt tail buggy this lateral movement is permitted under certain narrow limits, usually too narrow for the small attention and care which is allowed for economical mining. Deviation from these limits results in the scraping of the edges of the belt upon the side structure of the buggy and hence decreasing the life of the belt.

It is the principal object of the present invention to provide an improved extensible belt conveyor which incorporates improved means for permitting greatly increased relative lateral and vertical swing of an extensible belt tail buggy thereby eliminating belt damage from the movements caused by uneven mine floors.

In a preferred embodiment of the invention, there is provided a self-propelled base or main take-up buggy frame having at its rearward end a universally mounted tail pulley frame for mounting a reversing idler and alignment rollers which direct pivotal movement of the pulley frame in the event the belt becomes misaligned. The take-up buggy frame is further provided with a conveyor for receiving material from a continuous miner or another conveyor and discharging the same upon the extensible belt adjacent the reversing idler therefor. The tail pulley frame is so arranged and pivoted with respect to the other section of the buggy frame so as to afford maximum angular misalignment of the two sections without affecting the running of the belt, say where there are uneven or tilting mine floors or the operator inadvertently drives the take-up buggy out of longitudinal alignment, or the mining operation is being directed around a corner for crosscut purposes. The maximum swing of the tail pulley frame, with respect to the base or main take-up buggy frame, as measured from both sides of the longitudinal axis thereof is on the order of 50° and this, coupled with the maximum angular displacement of the conveyor section for a continuous miner, is sufficient to allow the initial cut and completion of turn for a crosscut operation by the continuous miner without the need for any intermediary piece of mining apparatus such as one or two shuttle cars and/or a conveyor carriage. In order to insure proper discharge of coal upon the extensible belt during the maximum horizontal displacement of the tail pulley frame, the rearward end of the conveyor of a continuous miner or other conveyor is arranged to overlie the reversible tail pulley of the extensible belt and extend to the rear of the universal pivot for the tail pulley frame. The conveyor speed is such as to throw the material upon the rear end of the extensible belt without the possibility of spilling down between the end pulley of the conveyor and the tail pulley of the belt, and over the sides of the tail pulley frame. Deflector plates are also provided on the tail pulley frame and these serve to center the material, as it is thrown on the end of the belt, adjacent the tail pulley, for minimizing spillage at this point and during the full conveyance of the material.

Another object of the present invention is to provide an improved tail pulley section having means associated therewith whereby it can be caused to pivot at the rearward end of a tail buggy in order to permit relatively large angular displacement therebetween. A further object is to provide an improved tail section buggy including a conveyor means and a tail pulley section associated therewith and at the rearward end of the latter. Another object still is to provide an improved tail buggy in which a conveyor associated therewith is adapted to discharge material upon an extensible belt having its tail pulley section universally pivoted at the rearward end of the tail section buggy, and, including means for ensuring centering of the discharged material upon the belt for all angular positions of the tail pulley with respect to the buggy as the same is moved about a mine floor.

Other objects and advantages of the invention will become apparent upon reading the following detailed description of the invention in conjunction with the accompanying drawings wherein:

Fig. 1 is a view in elevation of apparatus embodying the invention, the view being a vertical section through a mine to show the apparatus in position to receive mineral from a continuous miner;

Fig. 2 is a plan view of the take-up buggy showing parts broken away and other parts in various positions during operation;

Fig. 3 is a view in elevation of the take-up buggy showing various parts thereof in detail;

Figure 4:
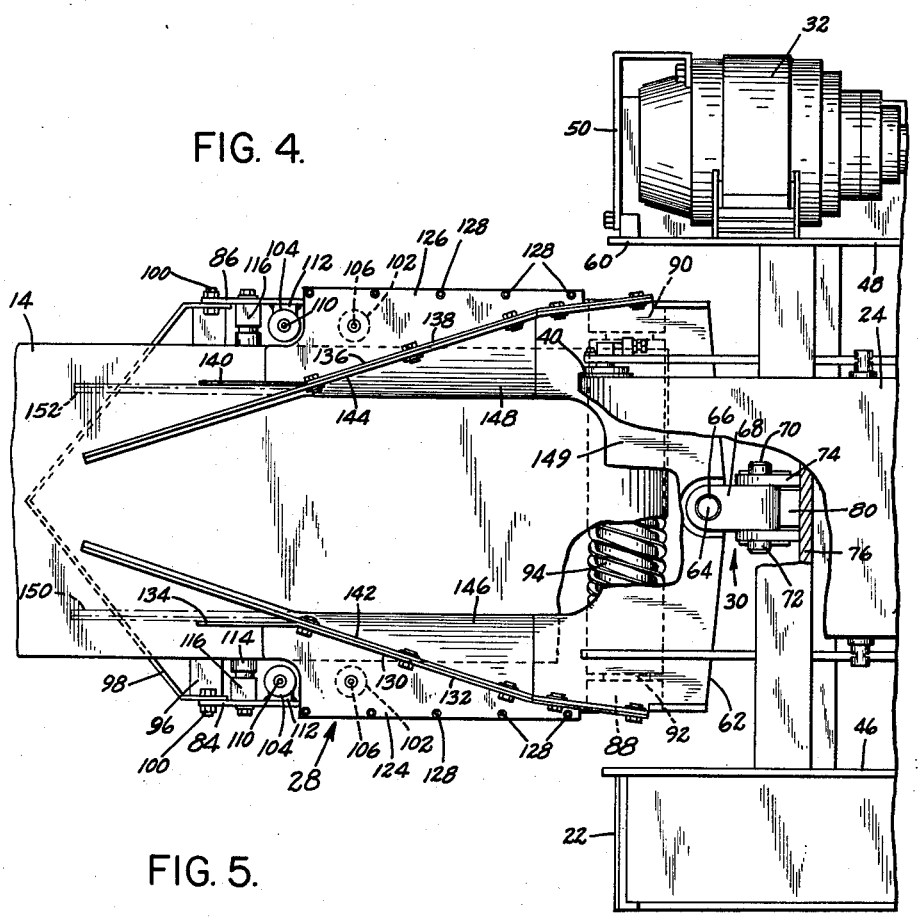
Fig. 4 is an enlarged plan view of the discharge end of the buggy showing parts broken away.

Referring now to the drawings, and particularly to Fig. 1, there is shown a drive buggy 10, a take-up buggy 12, an extensible conveyor belt 14 carried by the two buggies and a continuous miner 16 having a pivotal rearward conveyor 18 for discharging mineral removed from a face 20 onto the take-up buggy 12. The drive buggy 10 and the continuous miner 16 may be of any suitable type but it is preferred that the drive buggy 10 include means for taking up or paying out the belt 14 in the event the distance between the buggies is varied during mining operation.

Referring now to Figs. 2–5, the take-up buggy 12 comprises a main frame 22 for supporting a conveyor 24, a suitable ground-engaging means, such as the tracklaying devices shown at 26, and a belt engaging and supporting means or belt tail section frame 28 universally pivoted to the frame 22 at 30. Drive means for the conveyor 24 and the track-laying devices 26 includes a motor 32 for driving a three-unit hydraulic power device 34, two units of which may be connected in a suitable fluid system for selectively and independently driving the tracks 26 for driving and turning the buggy 12 about a mine floor, and the third unit for the conveyor 24 being connected therewith through a conventional fluid motor and chain drive means indicated generally at 36. The drive means 36 is shown as being operable upon a drive pulley 38 and a loop portion of the lower run of the conveyor 24. The drive pulley 38 and the end reversing idlers 40, 42 of the conveyor 24 are suitably journaled on the frame 22.

The frame 22 is illustrated as comprising a rectangular boxlike arrangement having an end plate 44, opposing side plates 46, 48 extending on either side of the longitudinal axis of the main support 22, and a superstructure 50 for supporting the motor 32 and the power device 34. As seen in Fig. 2, the frame 22 is open at one end adjacent the end idler 40, and includes side angle plates 52 secured to the lower portions of the side plates 46, 48 and a rear angle plate 54 secured to the lower portion of the end plate 44. The plates 52 and 54 project at a slight angle from a horizontal plane, the plates 52 overlapping the edges of the conveyor 24 and the plate 54 extending over the end idler 42. It will be apparent that the plates 52 and 54 serve as a floor for the frame 22 and to direct material discharged thereon onto the conveyor 24. Suitable side plates (not shown) may be secured on the edges of the plates 46, 48 in order to form a larger hopper having greater capacity for momentarily storing the material upon plates 52, and against the side plates as well as the conveyor 24 in the event the running of the belt 14 is interrupted.

The end of the frame 22, adjacent the tail pulley frame 28, is open to permit the conveyance of material therethrough. Each of the plates 52 is provided with bent wall portions 56 (only one is shown in Fig. 2) which extend upwardly at a suitable angle with respect to the plates 52. Horizontally disposed plates 58 are secured between the upper edges of the wall portions 56 and upwardly extending projections 60 formed rearwardly of the side plates 46, 48. As shown in the broken away portion of Fig. 2, the spaces underneath the plates 58 are open at the rearward end, or to the left, and free of any structure for a purpose to be described hereinafter. The built-up rearward end of the frame comprising the elements 56, 58 and 60 serve to permit a relatively large storage of material upon the frame 22 without effecting the flow of material upon the belt 14.

Figure 5:
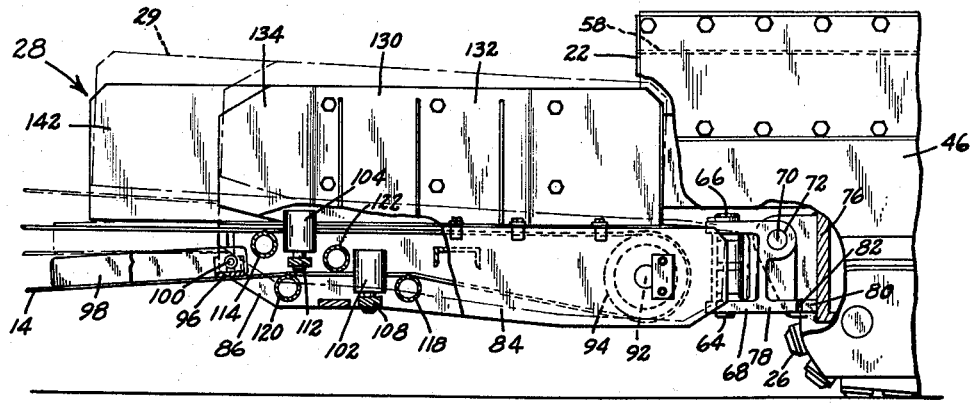
Fig. 5 is an enlarged view in elevation of the discharge end of the buggy showing parts broken away.

The belt supporting and tail pulley frame 28 is provided with a bight portion 62 pivotally supported for horizontal swinging about a vertical axis 64 by means of a pivot pin 66 extending through a bracket 68 which in turn is pivotally supported for vertical swinging about a horizontal axis at 70 by means of a pivot pin 72 extending through a bracket 74 secured to a support brace 76 formed on the frame 22. As shown in Fig. 5, the bracket 68 is formed with a lower horizontally disposed plate 78 which protrudes forwardly or to the right as viewed in the drawing. The end of the plate 78 is adapted to abut a block 80 secured to the brace 76 for limiting the counterclockwise rotation of the pulley frame 28 and suitable shims 82 may be inserted between the end of the plate 78 and the block 80 to raise the rearward or left end of the frame 28. It will be noted that although the frame 28 may be thus limited in a counterclockwise direction, the same may be pivoted, within certain narrow limits, in a clockwise direction. In Fig. 5 the dotted position 29 of the frame 28 indicates the upper limit of such rotation, and it will be evident that this upper limit may be fixed by the use of additional shims. In normal operation, the narrow pivotal range of the frame 28 is utilized to permit the buggy 12 to assume various angular positions in a vertical plane, resulting from the movement of the buggy along an uneven mine floor. In this event, conveyor belt 14, which normally exerts a pulling force on the buggy 12, will adjust the angular relationship between the frame 28 and the frame 22 thus minimizing any frictional engagement between the belt 14 and any structure on the frame 28 and minimize the angular displacement of the belt 14 which usually is present when the rear end of a take-up buggy moves in vertical planes caused by the unevenness of the mine floor.

The frame 28 has horizontally extending side arm portions 84, 86 which have journal boxes 88, 90 mounted thereon, respectively, for supporting a shaft 92 on which is mounted a tail or terminal pulley 94. The ends of the arms 84, 86, remote from the pulley 94, are connected together by a transverse brace 96 and a V-shaped scraper bar 98 which may be pivotally fastened at 100 to the ends of the arms 84, 86. The bar 98 is shown as lying on the upper surface of the lower run of the belt 14 and serves to scrape any dirt or foreign matter therefrom before that surface comes into engagement with the pulley 94.

The frame 28 is also provided with a self-training belt aligning means for continuously aligning the belt 14 centrally of the tail pulley 94 for all angular positions of the buggy 12 with respect to the longitudinal axis of the belt 14. The aligning means takes the form of upward guide rollers 102, 102 engageable by the edges of the lower run of the belt 14 and a similar pair of upright guide rollers 104, 104 engageable by the edges of the upper run of the belt. The guide rollers 102, 102 are suitably, rotatably supported on upright spindles 106, 106 fastened on brackets 108, 108 which are welded to the arms 84, 86 of the tail pulley frame 28. Similarly, the guide rollers 104, 104 are rotatably supported on upright spindles 110, 110 fastened on brackets 112, 112 which are welded to the arms 84, 86. It will be noted that the axes of the rollers 104, 104, are offset with respect to the axes of the rollers 102, 102 and preferably rearwardly of the latter. In this manner, one set of rollers will not interfere with the successful operation of the other set and both sets may be mounted as compactly as possible.

To ensure firm support of the edges of the belt 14 and to prevent their curling when they are in engagement with the guide rollers, means is provided on the arm portions 84, 86 to provide guidance and support for the belt close to the guide rollers. Preferably such means will be such as to prevent the edges of the belt from curling both downwardly and upwardly and to arrange the edges of the belt adjacent to the guide rollers in a line perpendicular to and at the midpoints, vertically, of the guide rollers. A horizontal belt support member or roller 114, in a position to be firmly engaged by the lower surface of the upper run of the belt 14, is journaled suitably on bearing brackets 116, one on each of the arm portions 84, 86. It will be noted in Fig. 5 that the roller 114 and the pulley 94 direct the upper run of the belt 14 in horizontal planes and at approximately the vertical midpoint of the guide rollers 104, 104.

A pair of horizontally disposed and parallel rollers 118, 120, in position to be engaged by the lower surface of the lower run of the belt 14, are journaled on suitable brackets (not shown) on each of the arms 84, 86 and a horizontal belt holddown roller 122 engageable by the upper surface of the lower run of the belt is likewise journaled in bearings on the arms. The rollers 118, 120 are preferably spaced from each other longitudinally of the belt at opposite sides of the plane of the axes of the guide rollers 102. It will be seen that the portion of the lower run between the rollers 118, 120 is in a line perpendicular to, and at the midpoint of, the axes of the guide rollers 102.

The tail section frame 28 is also provided with a horizontally displaced plate 124, secured to an overhanging flange on the side arm portion 84 and a similar plate 126 on the arm portion 86 as by a plurality of bolts 128. An upstanding deflector plate 130 is secured to the inner edge of the plate 124, and as shown in Figs. 2 and 4, has a portion 132 mounted at a slight angle to the longitudinal axis of the buggy 12 and a side portion 134 in a plane parallel to this axis. Similarly, the plate 126 has mounted thereon an upstanding deflector plate 136 having a portion 138 at an angle to the axis of the buggy 12 and a side portion 140 parallel to this axis. As shown in Fig. 4, each of the deflector plates 130, 136 has secured thereto a generally rectangular sheet of flexible material 142, 144 respectively, such as rubber, or rubber composition, which serves to channel or funnel the rapidly moving material from the conveyor 24 onto the portion of the belt 14 adjacent the frame 28. The lower inner corners 146, 148 of the sheets 142, 144 are turned inwardly toward the longitudinal axis of the frame 28 resulting in a smooth curved surface of the sheets 142, 144 for permitting jam-free passage of the material between the deflector plates 130, 136.

A sheet 149, made of the same material as the sheets 142, 144, is positioned horizontally above the belt 14 and secured to the frame 28 by any suitable means. The sheet 149 is cut so as to cover most of the belt 14 adjacent the tail pulley 94 and includes side portions which extend upwardly along the forward ends of the plates 130, 136 so as to conform with the forward edges of the sheets 142, 144, and thereby present, in conjunction therewith, a smooth surface for the material. It will be noted that the rearward ends of the sheets 142, 144, or to the left as viewed in Fig. 4, normally project beyond the plates 130, 136 and away from their respective side portions 134, 140. In the dotted positions 150, 152 of the sheets 142, 144, it is noted that the ends of the sheets are bent around to conform to the full lengths of the plates 130, 136 and such is the case during operation of the present invention when the conveyed material, traveling with the belt 14, pushes the ends of the sheets 142, 144 against the sides of the portions 134, 140. In this manner, the material, which may be strewn between the plates 130, 136 as the result of being laterally thrown from the conveyor 24, will become centered upon the belt 14 for eventual travel along the full length of the same.

The mode of operation of the improved take-up buggy-conveyor arrangement will be evident. As the material is dumped onto the conveyor 24, the same is conveyed to its discharge end adjacent the tail pulley frame 28. The speed of the conveyor 24, is such as to "throw" the material, when it reaches the end idler 40, upon the belt 14, at least, to the extent that the material will land thereon at a point a few inches from the idler 40. It will be noted in Figure 3, that the axis of the idler 40 is more rearward, or to the left, than the axis of the tail pulley 94, and that the pivot 64 is more forward than either the idler or pulley, and this, coupled with the throwing effect of the conveyor 24, will prevent the spillage of the material between the idler 40 and the tail pulley 94 when the same is rotated to the maximum permissible angle with respect to the idler 40.

As the material is dumped upon the belt 14, the deflector plates 130, 136, aided by the contour of the sheets 142, 144, guides the material centrally of the belt and evens out the distribution of the material thereon as the same progresses between the side plates 134, 140. In the event the buggy frame 22 is driven at an angle with respect to the longitudinal axis of the belt 14, the tail pulley frame 28, under a force exerted by the belt 14 by its pull in a direction away from the tail pulley, merely pivots horizontally about the pivot 64, as shown in Fig. 2, the tail frame 28 may be horizontally pivoted between either of the dotted positions 160, 162, which may be extended to as much as 50°, or 25° from either side of the axis of the belt 14. In the position shown at 160, the deflector plate 130 will conveniently move under in the unobstructed space below the plate 58 and in the position shown at 162, the deflector plate 136 will move under the other plate 58. In either of the extreme positions 160, 162, the deflector plate which is on the outside, will lie in and at an angle to the path of some of the material coming off the conveyor 24, and in this position will serve to deflect the material onto the belt and direct the flow through the side plates 134, 140. The curved portions 146, 148 of the sheets 142, 144 will assist in the operation to render a smooth withdrawal of the material from the frame 28. The plates 58 and the walls 56 of the frame 22 are so dimensioned with respect to the width of the conveyor 24 at this point and the spacing between the deflector plates 130, 136, that there will be no spillage of the material onto the mine floor for any position of the frame 28.

While there is in this application specifically described one form which the invention may assume in practice, it will be understood that this form of the same is shown for purposes of illustration and that the invention may be modified and embodied in other forms without departing from its spirit or the scope of the appended claims.

What I claim is:

1. In combination, a conveyor mechanism comprising a tail section, said tail section having a frame movable over the uneven floor of a mine and laterally along curved paths, said tail section having supporting and propelling means therefor, said frame providing a troughlike passageway extending lengthwise thereof, conveying means extending along the bottom of said passageway and having a discharge end at the outbye end of said tail section, a cooperating conveyor mechanism comprising a conveyor frame having an inbye end underlying said discharge end portion of said tail section frame, conveying means on said conveyor frame having its receiving end underlying said discharge end of said first mentioned conveying means whereby the material being conveyed by said first mentioned conveying means may be received by said second mentioned conveying means, means at the outbye end of said tail section providing a free universal pivotal connection between said tail section frame and said conveyor frame whereby the latter may automatically tilt and swing laterally relative to said tail section frame as said frame tail section is propelled, and said universal pivotal connection including coacting pivot elements on said tail section and conveyor frames beneath said discharge end portion of said tail section frame.

2. A combination as set forth in claim 1 wherein said tail section frame at the inbye end of said tail section remote from said universal pivotal connection has a hopperlike portion into which the material to be conveyed may be discharged.

3. A combination as set forth in claim 1 wherein said troughlike passageway of said first mentioned conveying means has a widened portion at the inbye end of said tail section, a relatively narrow portion at the sides of said discharge end of said conveying means at the outbye end of said tail section, and inclined sides are provided which connect said widened portion with said relatively narrow portion.

4. A combination as set forth in claim 1 wherein said pivoted conveyor frame has its portion which underlies said discharge end portion of said tail section frame laterally widened so that when said conveyor frame is swung laterally in its different positions it always underlies said discharge end of said first mentioned conveying means.

5. A mobile tail section for an extensible belt conveyor mechanism comprising a base having supporting and propelling means whereby the tail section may be propelled and steered as it travels over the floor of a mine, said base comprising a base frame provided with a troughlike passageway extending lengthwise thereof, conveying means extending along the bottom of said troughlike passageway and having a discharge end at the outbye end of the tail section, said passageway being laterally widened as it extends toward the inbye end of the tail section to provide a large capacity hopper for receiving the material to be conveyed, said passageway being relatively narrow as it extends along the sides of the discharge end of said conveying means, and the outbye end of said tail section having means for connection to an extensible belt section which comprises a free universal pivotal connection for the extensible belt section, whereby the tail section automatically may move angularly out of alignment with the extensible belt section as it travels over the mine floor and said base is propelled and steered.

References Cited in the file of this patent

UNITED STATES PATENTS

| | | |
|---|---|---|
| 1,383,281 | Bailey | July 5, 1921 |
| 2,099,512 | Cartlidge | Nov. 16, 1937 |
| 2,360,069 | Marvin | Oct. 10, 1944 |
| 2,507,341 | Lee | May 9, 1950 |
| 2,774,462 | Poundstone | Dec. 18, 1956 |
| 2,842,257 | Craggs et al. | July 8, 1958 |